US008254873B2

(12) United States Patent
Kitahara et al.

(10) Patent No.: US 8,254,873 B2
(45) Date of Patent: Aug. 28, 2012

(54) MOBILE COMMUNICATION SYSTEM, MOBILE COMMUNICATION METHOD, RADIO NETWORK CONTROLLER, RADIO BASE STATION AND MOBILE STATION

(75) Inventors: Ryo Kitahara, Yokohama (JP); Minami Ishii, Yokohama (JP); Katsuhiro Noguchi, Yokohama (JP); Kota Fujimura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 573 days.

(21) Appl. No.: 12/305,863

(22) PCT Filed: Jun. 19, 2007

(86) PCT No.: PCT/JP2007/062350
§ 371 (c)(1),
(2), (4) Date: Jun. 29, 2009

(87) PCT Pub. No.: WO2007/148703
PCT Pub. Date: Dec. 27, 2007

(65) Prior Publication Data
US 2010/0233990 A1    Sep. 16, 2010

(30) Foreign Application Priority Data

Jun. 19, 2006    (JP) .................................. 2006-169434

(51) Int. Cl.
*H04M 11/04*    (2006.01)
(52) U.S. Cl. ...................... 455/404.1; 455/401; 455/503; 455/412.2
(58) Field of Classification Search ................ 455/401.1, 455/503, 412.2
See application file for complete search history.

(56) References Cited

U.S. PATENT DOCUMENTS

| 2004/0176112 | A1 | 9/2004 | Beckmann et al. |
| 2005/0054331 | A1* | 3/2005 | Balachandran et al. ... 455/414.1 |
| 2005/0111395 | A1* | 5/2005 | Hwang et al. ................. 370/313 |
| 2005/0170842 | A1* | 8/2005 | Chen ............................ 455/454 |

FOREIGN PATENT DOCUMENTS

| CN | 1565140 A | 1/2005 |
| JP | 7 58689 | 3/1995 |

(Continued)

OTHER PUBLICATIONS

Office Action issued Sep. 28, 2010 in Korean Application No. 10-2003-7031287 (With English Translation).

(Continued)

*Primary Examiner* — Kwasi Karikari
(74) *Attorney, Agent, or Firm* — Oblon, Spivak, McClelland, Maier & Neustadt, L.L.P.

(57) ABSTRACT

In a mobile communication system, the radio device RNC, Node B includes: a creation unit 11 configured to create, on the basis of the notification information received from the distribution server, simplified information indicating content of the notification information, and detailed information indicating content of the notification information with a greater amount of information than that of the simplified information; a simplified information transmitter unit 12, 34 configured to transmit the simplified information to the mobile station by use of a control channel for starting the broadcast communication; and a detailed information transmitter unit 15, 35 configured to transmit the detailed information to the mobile station by use of a traffic channel for broadcast communication, and the mobile station UE includes: a display unit 55, 58 configured to display the received detailed information, after displaying the received simplified information.

7 Claims, 9 Drawing Sheets

FOREIGN PATENT DOCUMENTS

| | | |
|---|---|---|
| JP | 10 42365 | 2/1998 |
| JP | 2000-244976 | 9/2000 |
| JP | 2004 40197 | 2/2004 |
| JP | 2004 538731 | 12/2004 |
| JP | 2005 333654 | 12/2005 |

OTHER PUBLICATIONS

"3rd Generation Partnership Project; Technical Specification Group Terminals; Technical realization of Cell Broadcast Service (CBS)", 3GPP TS 23.041 V7.0.0, Release 7, pp. 1-35, (2006).

"3rd Generation Partnership Project; Technical Specification Group Services and System Aspects; Multimedia Broadcast/Multicast Service (MBMS); Architecture and functional description", 3GPP TS 23.246 V6.10.0, Release 6, pp. 1-47, (2006).

Japanese Office Action issued on Mar. 8, 2011 in corresponding Japanese Application No. 2008-522479 (with an English Translation).

Office Action issued Mar. 23, 2011 in Chinese Patent Application No. 200780023047.8 (with English translation).

Korean Office Action issued Jun. 30, 2011, in Patent Application No. 10-2008-7031287 (with English-language translation).

Office Action issued Nov. 30, 2010, in Japan Patent Application No. 2008-522479 (with English translation).

Office Action issued Aug. 23, 2011, in Chinese Patent Application No. 200780023047.8 with English translation.

Korean Office Action dated Mar. 29, 2012 in Korean Patent Application No. 10-2008-7031287 (with English Translatlion).

Taiwanese Office Action dated Mar. 14, 2012 in Taiwanese Patent Application No. 096122083 (with English Translation).

* cited by examiner

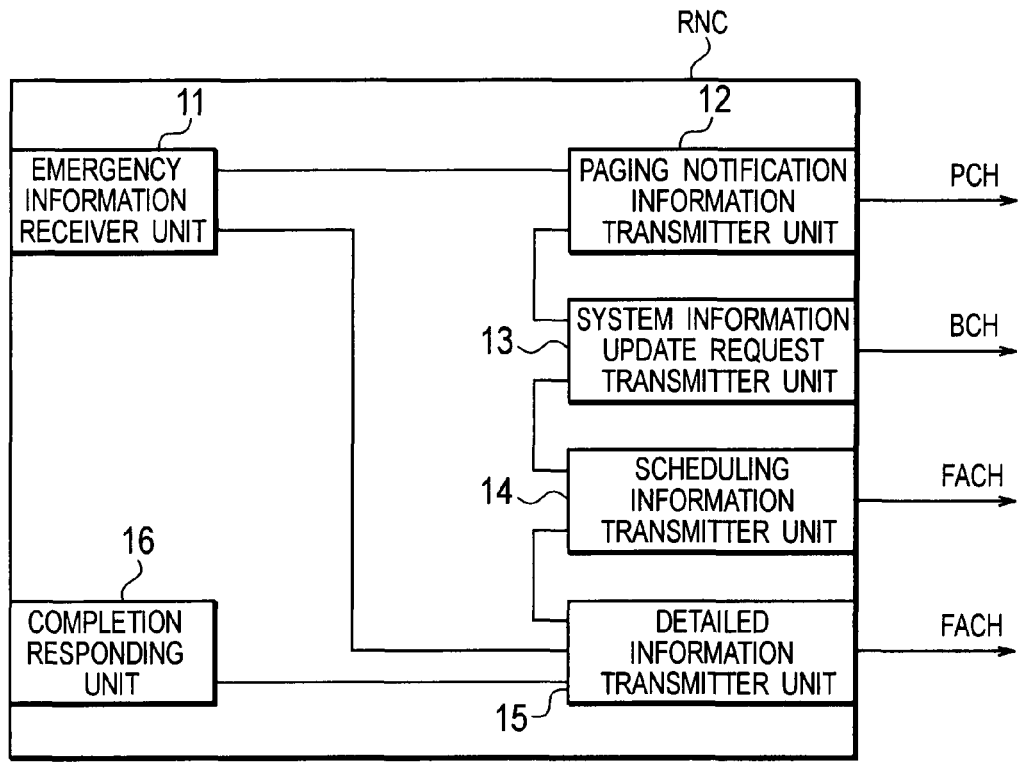
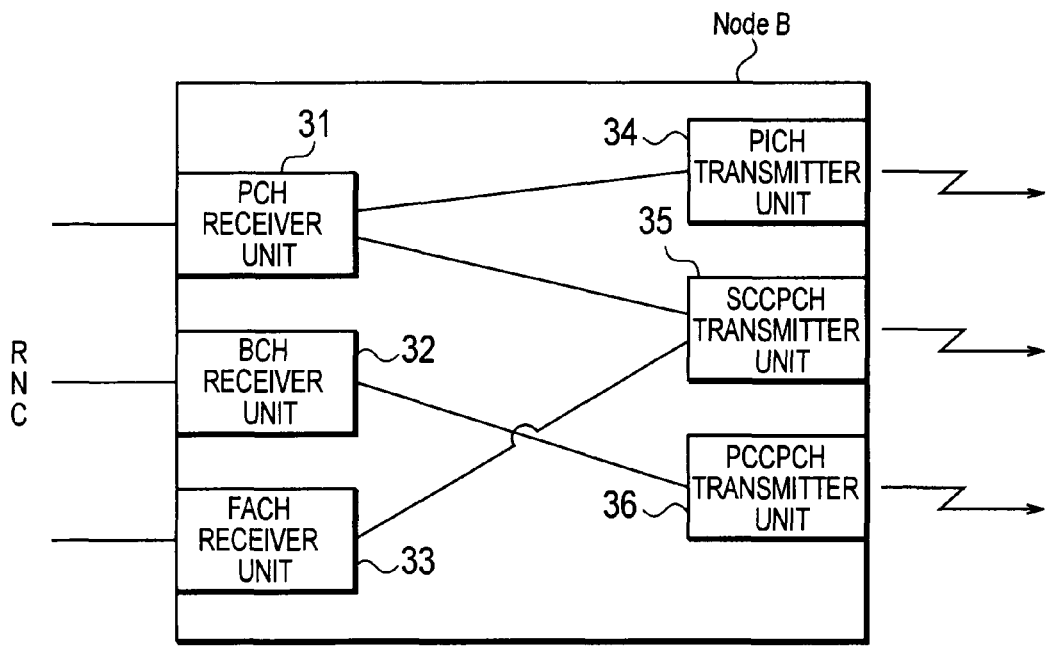

MOBILE COMMUNICATION SYSTEM, MOBILE COMMUNICATION METHOD, RADIO NETWORK CONTROLLER, RADIO BASE STATION AND MOBILE STATION

BACKGROUND OF THE INVENTION

1. Field of the Invention

The present invention relates to a mobile communication system, a mobile communication method, a radio network controller, a radio base station and a mobile station, employing a configuration in which a radio device transmits, to mobile stations by use of broadcast communication, emergency information transmitted from a distribution server.

2. Description of the Related Art

Heretofore, there have been known mobile communication systems for transmitting, to mobile stations, emergency information such as earthquake information or "tsunami" information issued by a public office, a local government, or the like, by use of broadcast communication such as a cell broadcast service (hereinafter, referred to as a "CBS") or a multimedia broadcast/multicast service (hereinafter, referred to as an "MBMS").

Specifically, in such a mobile communication system for transmitting the emergency information, a radio network controller RNC is configured to transmit the aforementioned emergency information to mobile stations located in a particular coverage area, by use of a traffic channel for broadcast communication such as a common traffic channel (CTCH) or an MBMS traffic channel (MTCH). Here, the emergency information is received from a terminal device of a public office, a local government, or the like, via a distribution server.

In such conventional mobile communication systems for transmitting the emergency information, there is, however, a problem that long delay time is required for the emergency information to reach the mobile station. This problem occurs since a radio network controller needs to transmit information via various channel, before transmitting information via a traffic channel for broadcast communication such as a CTCH or MT CH.

(Non-Patent document 1) 3GPP TS23.041
(Non-Patent document 2) 3GPP TS23.246

DISCLOSURE OF THE INVENTION

The present invention is made while taking the aforementioned problem into consideration. An object of the present invention is to provide a mobile communication system, a mobile communication method, a radio network controller, a radio base station and a mobile station which are capable of reducing delay time during the transmission of the emergency information to mobiles stations by use of broadcast communication.

A first aspect of the present invention is summarized as a mobile communication system in which a radio device configured to transmit notification information transmitted from a distribution server, to a mobile station by use of broadcast communication, wherein: the radio device includes: a creation unit configured to create, on the basis of the notification information received from the distribution server, simplified information indicating content of the notification information, and detailed information indicating content of the notification information with a greater amount of information than that of the simplified information; a simplified information transmitter unit configured to transmit the simplified information to the mobile station by use of a control channel for starting the broadcast communication; and a detailed information transmitter unit configured to transmit the detailed information to the mobile station by use of a traffic channel for broadcast communication, and the mobile station includes a display unit configured to display the detailed information transmitted using the traffic channel, after displaying the simplified information transmitted using the control channel.

A second aspect of the present invention is summarized as a mobile communication method for transmitting notification information transmitted from a distribution server, from a radio device to a mobile station, by use of broadcast communication, the method including: transmitting, at the distribution server, the notification information to the radio device; creating, at the radio device, simplified information indicating content of the notification information, on the basis of the notification information received from the distribution server; transmitting, at the radio device, the simplified information to the mobile station using a control channel for starting the broadcast communication; displaying, at the mobile station, the simplified information transmitted using the control channel; creating, at the radio device, detailed information having a greater amount of information than that of the simplified information and indicating content of the notification information, on the basis of the notification information; transmitting, at the radio device, the detailed information to the mobile station using a traffic channel for broadcast communication; and displaying, at the mobile station, the detailed information transmitted using the traffic channel.

A third aspect of the present invention is summarized as a radio network controller configured to transmit notification information transmitted from a distribution server, to a mobile station by use of broadcast communication, the controller including: a creation unit configured to create, on the basis of the notification information received from the distribution server, simplified information indicating content of the notification information, and detailed information having a greater amount of information than that of the detailed information and indicating content of the notification information; a simplified information transmitter unit configured to transmit the simplified information to the mobile station by use of a control channel for starting the broadcast communication; and a detailed information transmitter configured to transmit the detailed information to the mobile station by use of a traffic channel for broadcast communication.

In the third aspect, the simplified information transmitter unit can be configured to transmit the simplified information by use of a channel for notifying a specific mobile station that there is incoming information.

A fourth aspect of the present invention is summarized as a radio base station configured to transmit notification information transmitted from a distribution server, to a mobile station by use of broadcast communication, the radio base station including: a simplified information transmitter unit configured to transmit, to the mobile station by use of a control channel for stating the broadcast communication, simplified information indicating content of the notification information created on the basis of the notification information received from the distribution server; and a detailed information transmitter unit configured to transmit, to the mobile station by use of a traffic channel for broadcast communication, detailed information indicating content of the notification information created on the basis of the notification information and having a greater amount of information than that of the simplified information.

In the fourth aspect, the simplified information transmitter unit can be configured to transmit the simplified information by use of a channel for notifying a specific mobile station that there is incoming information.

A fifth aspect of the present invention is summarized as a mobile station configured to receive notification information transmitted by use of broadcast communication, including: a simplified information receiver unit configured to receive, through a control channel for starting the broadcast communication, simplified information indicating content of the notification information created on the basis of the notification information transmitted from a distribution server; a detailed information receiver unit configured to receive, through a traffic channel for broadcast communication, detailed information indicating content of the notification information created on the basis of the notification information and having a greater amount of information than that of the simplified information; and a display unit configured to display the received detailed information, after displaying the received simplified information.

BRIEF DESCRIPTION OF THE DRAWINGS

FIG. 2 is a functional block diagram of a radio network controller RNC according to the first embodiment of the invention.

FIG. 3 is a functional block diagram of a radio base station Node B according to the first embodiment of the invention.

BEST MODES FOR CARRYING OUT THE INVENTION (Mobile Communication System According to First Embodiment of the Invention)

A configuration of a mobile communication system according to a first embodiment of the present invention will be described with reference to FIGS. 1 to 6.

In the mobile communication system according to the present embodiment, a radio device (a radio network controller RNC, a base station Node B, or the like) is configured to transmit "emergency information (such as earthquake information or "tsunami" information issued by a public office, a local government, or the like)" which is a type of notification information transmitted from a distribution server, to mobile stations, by use of a cell broadcast service (CBS).

Figure 1:
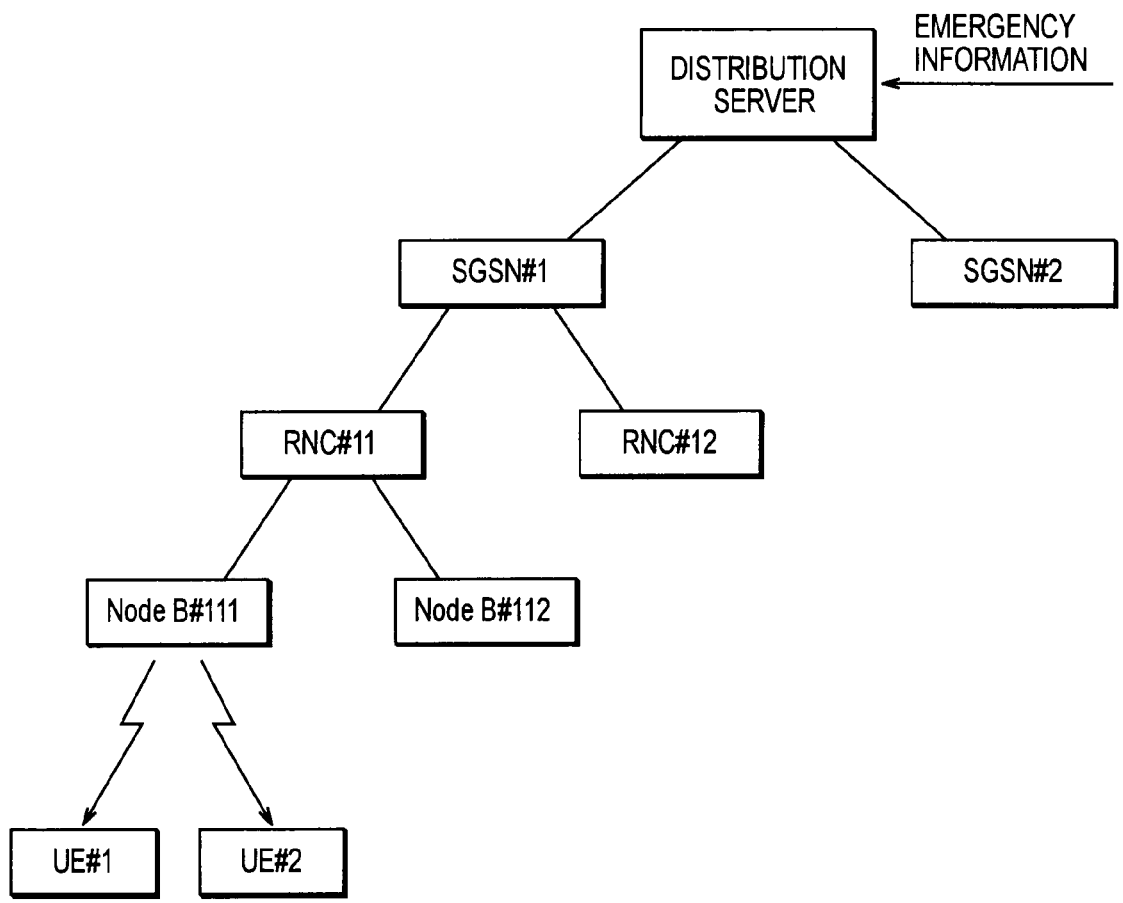
FIG. 1 is an overall configuration diagram of a mobile communication system according to a first embodiment of the invention.

Specifically, as shown in FIG. 1, the mobile communication system according to the present embodiment includes: a distribution server; a plurality of exchange nodes SGSN (Serving GPRS Support Node) #1 and #2; a plurality of radio network controllers RNC #11 and #12; a plurality of radio base stations Nodes B#111 and #112; and a plurality of mobile stations UE #1 and #2.

It should be noted that, although, for the sake of convenience of description, two units each of the exchange nodes SGSN, radio network controllers RNC, radio base stations Node B and mobile stations UE are shown in the example of FIG. 1, the present invention can be applied to an exemplary case where the mobile communication system includes more than two units each of these devices as a matter of course.

The distribution server functions as a cell broadcast center (hereinafter, referred to as a "CBC").

The distribution server is configured to receive the emergency information such as earthquake information or "tsunami" information issued by a public office, a local government, or the like, in a case where an event such as an earthquake or a tsunami occurs; and then to transmit such emergency information to predetermined radio network controllers RNC via exchange nodes SGSN.

It should be noted that communications between the distribution server and the radio network controllers RNC are to be performed using the SABP (Service Area Broadcast Protocol), which is specified by the 3GPP TS25.419.

As shown in FIG. 2, a radio network controller RNC includes: an emergency information receiver unit 11, a paging notification information transmitter unit 12, a system information update request transmitter unit 13, a scheduling information transmitter unit 14, a detailed information transmitter unit 15 and a completion responding unit 16.

The emergency information receiver 11 unit is configured to receive the emergency information transmitted from a distribution server.

Then, on the basis of the received emergency information, the emergency information receiver unit 11 is configured to create simplified information indicating content of the emergency information, and detailed information with greater amount of information than that of the simplified information while indicating the content of the emergency information.

Figure 6:
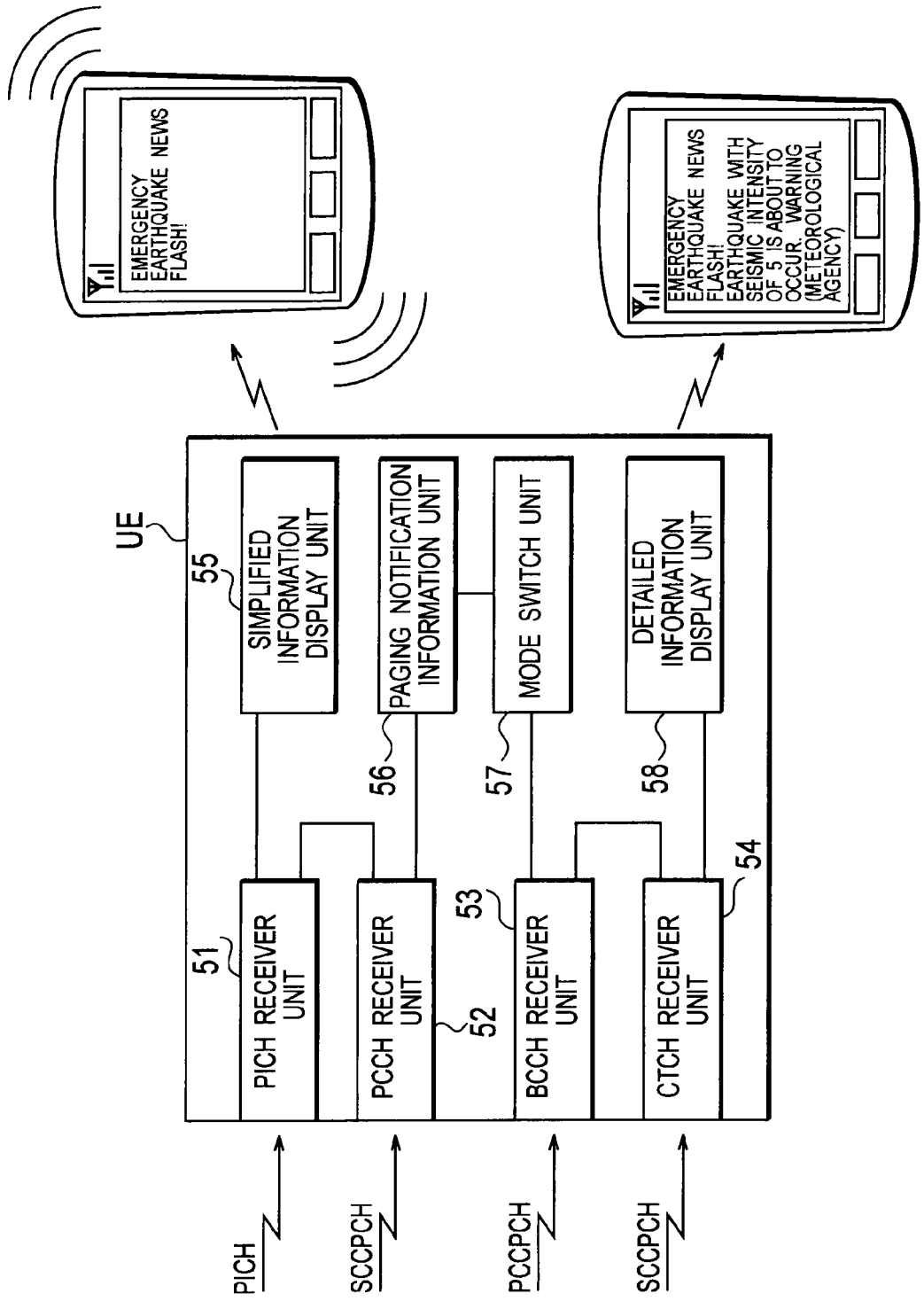
FIG. 6 is a functional block diagram of a mobile station UE according to the first embodiment of the invention.

For example, the simplified information is the information that indicates content of the emergency information with a small amount of information, such as simplified information A "Emergency Earthquake News Flash!" in FIG. 6.

In contrast to this, the detailed information is the information that fulfills a function of transmitting the content of the emergency information in detail with a greater amount of information than that of the simplified information, such as detailed information B "Emergency Earthquake News Flash! Earthquake with seismic intensity of 5 is about to occur. Warning (Meteorological Agency)".

The paging notification information transmitter unit 12 is configured to transmit paging notification information to the mobile stations UE located in a predetermined paging area through one of the node stations Node B.

Specifically, the paging notification information transmitter unit 12 is configured to transmit the paging notification information, by use of a paging control channel (hereinafter referred to as a "PCCH"), which is a control channel for starting the CBS (broadcast communication), and a logical channel for notifying specific mobile stations (mobile stations that belong to a specific group) that there is incoming information.

It should be noted that the paging notification information transmitter unit 12 is configured to transmit the paging notification information included the PCCH which is a logical channel, to one of the radio base stations Node B, through a paging channel (hereinafter, referred to as a "PCH") which is a transport channel.

Moreover, the paging notification information transmitter unit 12 is configured to transmit the simplified information created by the emergency information receiver unit 11, to the radio base station Node B.

Here, the paging notification information transmitter unit 12 may be configured to transmit the simplified information along with the paging notification information, by use of the PCCH.

In such case, the paging notification information transmitter unit 12 is configured to input the simplified information to the "payload capacity (240 bits) (refer to the 3GPP TS34.108)" of the PCCH, for example.

The system information update request transmitter unit 13 is configured to transmit a "System Information Update Request" for requesting the mobile stations UE to update system control information, to the radio base station Node B.

Specifically, the system information update request transmitter unit 13 is configured to transmit the "System Information Update Request" instructing the mobile stations UE to refer to a common control channel (hereinafter, referred to as a "CTCH") which is a traffic channel (logical channel) for the CBS (broadcast communication), to the mobile stations UE, through a broadcast control channel (hereinafter, referred to as a "BCCH").

It should be noted that the system information update request transmitter unit 13 is configured to transmit the "System Information Update Request" included in the BCCH which is a logical channel, to the radio base station Node B, through a broadcast channel (hereinafter, referred to as a "BCH") which is a transport channel.

Moreover, the system information update request transmitter unit 13 may be configured to transmit the aforementioned simplified information, by use of a BCCH, rather than the PCCH, as the control channel for starting the CBS (broadcast communication).

The scheduling information transmitter unit 14 is configured to transmit, to the mobile stations UE, a "BMC scheduling message" which is scheduling information for the CTCH.

Specifically, the scheduling information transmitter unit 14 is configured to transmit information indicating by which block the emergency information (detailed information) should be received in the subsequent CTCH, through the CTCH which is a traffic channel (logical channel) for the CBS.

It should be noted that the scheduling information transmitter unit 14 is configured to transmit information included in the CTCH which is a traffic channel (logical channel) for the CBS, to the radio base station Node B, via a forward access channel (hereinafter, referred to as an "FACH") which is a transport channel.

The detailed information transmitter unit 15 is configured to transmit the detailed information created by the emergency information receiver unit 11, to the mobile stations UE, by use of the CTCH which is a traffic channel for the CBS.

It should be noted that the detailed information transmitter unit 15 is configured to transmit information included in the CTCH which is a traffic channel (logical channel) for the CBS, to the radio base station Node B, through the FACH which is a transport channel.

The completion responding unit 16 is configured to notify, by use of a "Report-Success", the distribution server that the transmission of the detailed information to the mobile stations UE is completed, upon completion of the transmission of the detailed information.

As shown in FIG. 3, the radio base station Node B includes: a PCH receiver unit 31; a BCH receiver unit 32; an FACH receiver unit 33; a PICH transmitter unit 34; an SCCPCH transmitter unit 35; and a PCCPCH transmitter unit 36.

The PCH receiver unit 31 is configured to receive information transmitted from the radio network controller RNC via the PCH which is a transport channel.

Specifically, the PCH receiver unit 31 is configured to detect the information over the PCH, and to notify the PICH transmitter unit 34 and the SCCPCH transmitter unit 35 of the detected information.

The BCH receiver 32 is configured to receive information transmitted from the radio network controller RNC via the BCH which is a transport channel.

Specifically, the BCH receiver unit 32 is configured to detect the information over the BCH, and to notify the PCCPCH transmitter unit 36 of the detected information.

The FACH receiver unit 33 is configured to receive information transmitted from the radio base network controller RNC via the FACH which is a transport channel.

Specifically, the FACH receiver unit 33 is configured to detect the information over the FACH, and to notify the SCCPCH transmitter unit 35 of the detected information.

The PICH transmitter unit 34 is configured to transmit predetermined information, via a paging indication channel (PICH), which is a control channel for starting the CBS (broadcast communication), and which is a physical channel used for notifying a specific mobile station that there is incoming information.

Here, the PICH transmitter unit 34 may be configured to transmit the simplified information included in the PCH notified by the PCH receiver unit 31, to mobile stations UE, by use of the PICH.

Figure 5:
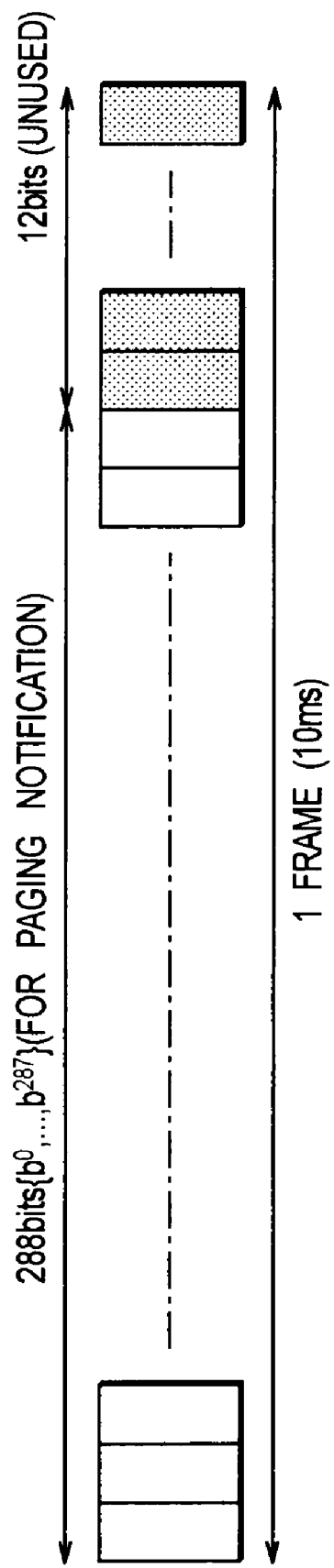
FIG. 5 is a diagram showing one of configurations of a PICH used in the mobile communication system according to the first embodiment of the invention, and an MICH used in a mobile communication system according to a second embodiment of the invention.

Specifically, as shown in FIG. 5, the PICH transmitter unit 34 maybe configured to transmit the simplified information, by use of unused 12 bits in a frame constituting the PICH.

For example, the PICH transmitter unit 34 may be configured to transmit the simplified information for notifying the occurrence of an earthquake, by setting the last 4 bits of the 12 bits to "0101".

Alternatively, the PICH transmitter unit 34 may be configured to transmit the simplified information for notifying the occurrence of a flood, by setting the last 4 bits of the 12 bits to "1010".

The SCCPCH transmitter unit 35 is configured to transmit predetermined information, via a secondary common control physical channel (SCCPCH) which is a downlink shared channel and a physical channel. A plurality of SCCPCH can exist in each cell.

Specifically, the SCCPCH transmitter unit 35 is configured to transmit information included in the PCCH notified by the PCH receiver unit 31 through the PCH and information included in the CTCH notified by the FACH receiver unit 33 through the FACH, via an SCCPCH which is a physical channel associated with the PCCH and the CTCH.

Specifically, the SCCPCH transmitter unit 35 may be configured to transmit the aforementioned simplified information to mobile stations UE, by use of the PCCH associated with the SCCPCH.

Moreover, the SCCPCH transmitter unit 35 may be configured to transmit the aforementioned detailed information to mobile stations UE, by use of the CTCH (traffic channel for the CBS) associated with the SCCPCH.

The PCCPCH transmitter unit 36 is configured to transmit predetermined information, via a primary common control physical channel (PCCPCH) which is a downlink shared channel and a physical channel. Only one PCCPCH can exist in each cell.

Specifically, the PCCPCH transmitter unit 36 is configured to transmit information included in the BCCH notified by the BCH receiver unit 32 through the BCH, via a PCCPCH which is a physical channel associated with the BCCH.

Figure 4:
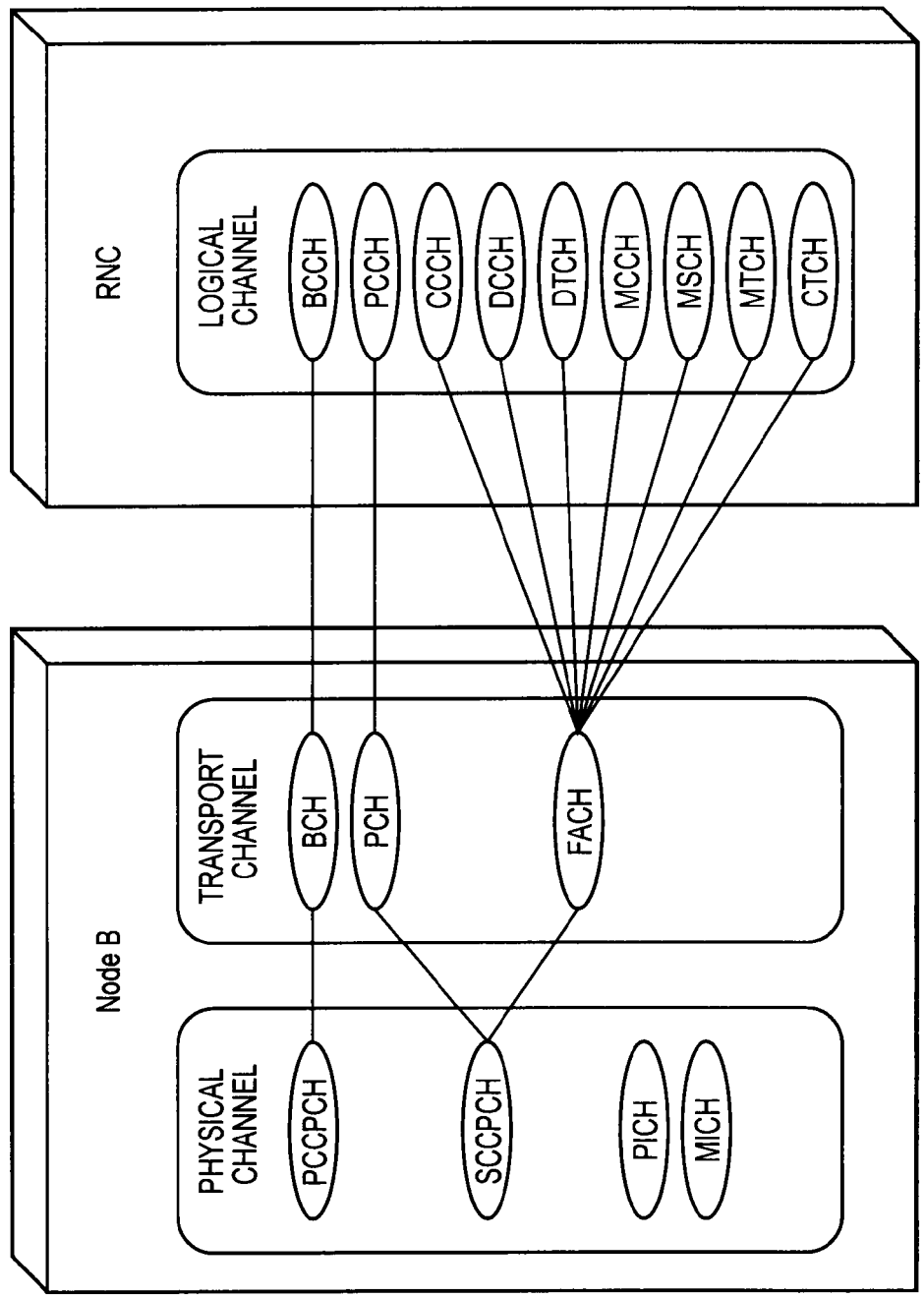
FIG. 4 is a diagram showing a channel configuration in the mobile communication system according to the first embodiment of the invention.

It should be noted, that FIG. 4 is a diagram showing correspondence relationships of channels (logical channels, transport channels and physical channels) used between a radio network controller RNC and a radio base station Node B.

As shown in FIG. 6, a mobile station UE includes a PICH receiver unit 51, a PCCH receiver unit 52, a BCCH receiver unit 53, a CTCH receiver unit 54, a simplified information display unit 55, a paging notification information receiver unit 56, a mode switch unit 57 and a detailed information display unit 58.

The PICH receiver unit 51 is configured to receive information transmitted from the radio base station Node B via the PICH, then to extract simplified information included in the received information, and to transmit the simplified information to the simplified information display unit 55.

Furthermore, the PICH receiver unit 51 is configured to receive information transmitted from the radio base station Node B via the PICH, and then to notify the PCCH receiver unit 52 of the information on the PCCH associated with the PICH.

The PCCH receiver unit 52 is configured to receive information transmitted from a radio base station Node B via the SCCPCH, and to receive information included in the PCCH associated with the SCCPCH.

The simplified information display unit 55 is configured to display the simplified information received by the PICH receiver unit 51.

Moreover, the simplified information display unit 55 may be configured to display the simplified information included in the PCCH received by the PCCH receiver unit 52.

In addition, the simplified information display unit 55 may be configured to display the simplified information included in the BCCH received by the BCCH receiver unit 53.

Specifically, the simplified information display unit 55 may be configured to display the simplified information A on the display screen as shown in FIG. 6, or may be configured to notify, by use of an alarm or a vibration function, the user that simplified information has been received.

For example, the simplified information display unit 55 may be configured to display information on reception of the simplified information notifying "occurrence of earthquake", in a case where "0101" is set in the last 4 bits of predetermined 12 bits in the PICH.

Alternatively, the simplified information display unit 55 maybe configured to display information on reception of the simplified information notifying "occurrence of flood", in a case where "1010" is set in the last 4 bits of the predetermined 12 bits in the PICH.

The paging notification information receiver unit 56 is configured to receive paging notification information included in the PICH received by the PCCH receiver unit 52.

The mode switch unit 57 is configured to switch from an intermittent receiving mode for saving power consumption to a normal receiving mode, according to the paging notification information received by the paging notification information receiver unit 56.

Specifically, on the basis of the paging notification information received by the paging notification information receiver unit 56, the mode switch unit 57 instructs the BCCH receiver unit 53 to receive information included in the BCCH.

The BCCH receiver unit 53 is configured to receive, in accordance with the instruction from the mode switch unit 57, information included in the BCCH associated with the PCCPCH transmitted from a radio base station Node B.

The CTCH receiver unit 54 is configured to receive, in accordance with the information included in the BCCH received by the BCCH receiver unit 53, information included in the CTCH associated with the SCCPCH transmitted from the radio base station Node B.

Specifically, the CTCH receiver unit 54 is configured to first extract scheduling information from the received information included in the CTCH, and thereafter, to receive the aforementioned detailed information as the CBS message on the basis of the scheduling information.

As shown in FIG. 6, the detailed information display unit 58 is configured to display, on the display screen, the detailed information B received by the CTCH receiver unit 54.

(Operation of Mobile Communication System According to First Embodiment of the Invention)

Hereinafter, an operation of a mobile communication system according to the present embodiment will be described with reference to FIG. 7.

Figure 7:
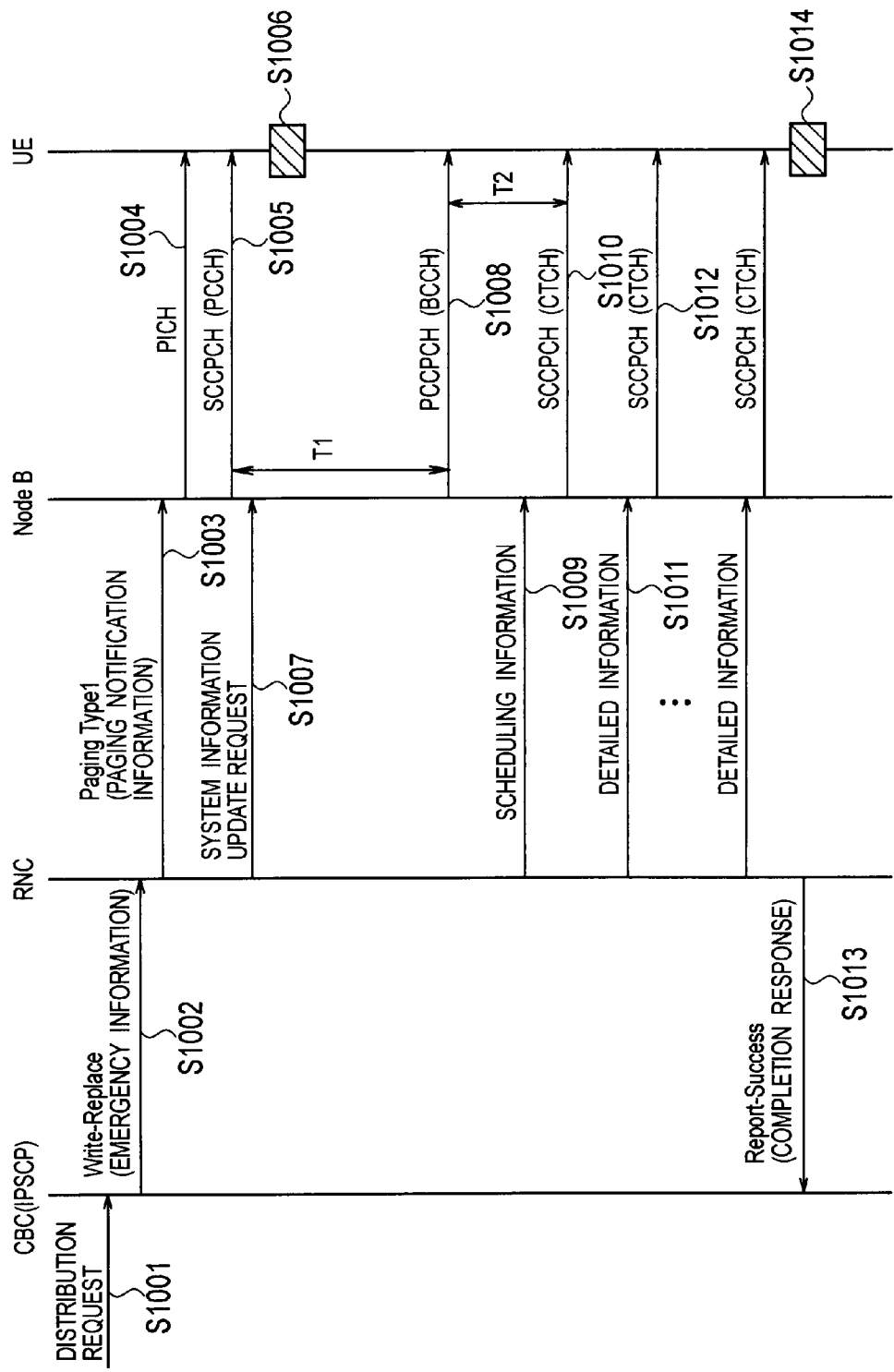
FIG. 7 is a sequence diagram showing an operation of transmitting emergency information in the mobile communication system according to the first embodiment of the invention.

As shown in FIG. 7, in step S1001, a distribution server CBC receives a distribution request for the emergency information such as earthquake information or "tsunami" information from a public office, a local government, or the like. Here, assume that such distribution request includes the emergency information and a distribution area (paging area) of the emergency information.

In step S1002, the distribution server CBC transmits the emergency information to a radio network controller RNC corresponding to the distribution area, by use of a "Write-Replace".

In step S1003, the radio network controller RNC transmits paging notification information (Paging Type 1), to a radio base station Node B, via a PCH associated with a PCCH.

Here, the radio network controller RNC may insert the simplified information created on the basis of the emergency information into the PCCH and then transmit the simplified information with the PCCH, or may transmit the simplified information separately from the PCCH.

In step S1004, the radio base station Node B notifies the paging notification information (Paging Type 1) by a PICH to mobile stations UE located in the specific distribution area.

In step S1005, the radio base station Node B transmits information included in the PCCH, via an SCCPCH associated with the PCCH to the mobile stations UE located in the specific distribution area.

Here, the simplified information may be transmitted by the PICH, or by the PCCH associated with the SCCPCH. In addition, the simplified information may be transmitted by a BCCH to be described later.

In step S1006, the mobile stations UE display the simplified information received through the PICH or PCCH.

In step S1007, the radio network controller RNC transmits, to the radio base station Node B, through a BCH associated with a BCCH, a system information update request for instructing the radio base station Node B to receive information included in a CTCH.

In step S1008, the radio base station Node B transmits information included in the BCCH via a PCCPCH associated with the BCCH, after it is determined that the reception of the information included in the PCCH is completed by all the mobile stations UE; in other words, when a T1 second passes after the transmission of the information included in the PCCH.

In step S1009, the radio network controller RNC transmits, to the radio base station Node B, through an FACH, the scheduling information, which is included in a CTCH, for receiving the detailed information.

In step S1010, the radio base station Node B transmits the information included in the CTCH, via an SCCPCH associated with the CTCH, after it is determined that the reception of the information included in the BCCH is completed by all the mobile stations UE; in other words, when a T2 second passes after the transmission of the information included in the BCCH.

In step S1011, on the basis of the scheduling information, the radio network controller RNC transmits, to the radio base station Node B, the detailed information included in the CTCH, through an FACH.

In step S1012, the radio base station Node B transmits the detailed information included in the CTCH, via an SCCPCH associated with the CTCH.

In step S1013, the radio network controller RNC transmits, to the distribution server CBC, a "Report-Success" to notify that the transmission of the aforementioned detailed information has been completed.

In step S1014, each one of the mobile stations extracts the detailed information included in the CTCH, and displays the detailed information according to the aforementioned scheduling information.

(Effect and Advantage of Mobile Communication System According to First Embodiment of the Invention)

In the mobile communication system according to the present embodiment, the emergency information is separated into the simplified information having a smaller amount of information and the detailed information having a greater amount of information.

In the mobile communication system, a mobile station UE is configured to receive the simplified information through a control channel (one of a PICH and PCCH) for starting a CBS (broadcast communication) instead of through a traffic channel (CTCH) for a CBS.

Thus, it is possible to resolve the problem of time delay for the emergency information to reach the mobile station.

(Configuration of Mobile Communication System According to Second Embodiment of the Invention)

A mobile communication system according to a second embodiment of the present invention is described with reference to FIGS. 8 to 10.

Hereinafter, the mobile communication system of the present embodiment will be described focusing on differences from the aforementioned mobile communication system according to the first embodiment.

In the mobile communication system according to the present embodiment, a radio device (a radio network controller RNC, a radio base station Node B, or the like) is configured to transmit, to mobile stations, by use of a multimedia broadcast/multicast service (MBMS), the emergency information (earthquake information, "tsunami" information, or the like issued by a public office, a local government, or the like) transmitted from a distribution server.

Figure 8:
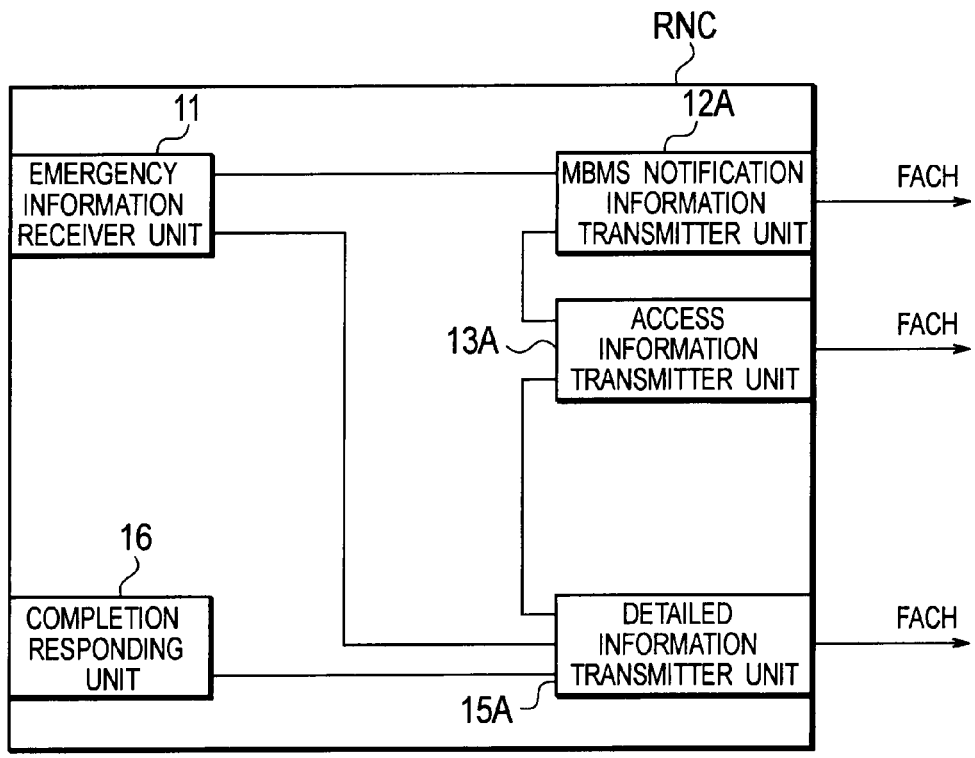
FIG. 8 is a functional block diagram of a radio network controller RNC according to the second embodiment of the invention.

As shown in FIG. 8, the radio network controller RNC includes: an emergency information receiver unit 11; an MBMS notification information transmitter unit 12A; an access information transmitter unit 13A; a detailed information transmitter unit 15A; and a completion responding unit 16.

The MEMS notification information transmitter unit 12A is configured to transmit MBMS information, through the radio base station Node B, to mobile stations UE located in a predetermined MBMS service area.

Specifically, the MBMS notification information transmitter unit 12A is configured to transmit the MBMS notification information, by use of an MBMS control channel (MCCH), which is a control channel for starting the MBMS, and which is a logical channel for notifying a specific mobile station that there is incoming information.

It should be noted that the MBMS notification information transmitter unit 12A is configured to transmit, to a radio base station Node B, through an FACH which is a transport channel, the MBMS notification information included in an MCCH which is a logical channel.

Moreover, the MBMS notification information transmitter unit 12A is configured to transmit the simplified information created by the emergency information receiver unit 11, to the radio base station Node B.

Here, the MBMS notification information transmitter unit 12A may be configured to transmit the simplified information along with the MBMS notification information, by use of an FACH.

In such case, the MEMS notification information transmitter unit 12A is configured to input the simplified information to the "payload capacity (240 bits) (refer to 3GPP TS34.108))" of an MCCH.

The access information transmitter unit 13A is configured to transmit, to mobile stations UE, through an MBMS control channel (MCCH) which is a logical channel, access information instructing the mobile stations UE to refer to an MEMS traffic channel (MTCH) which is a traffic channel (logical channel) for an MBMS (broadcast communication).

Here, the access information may include a "multicast group ID" for indicating the multicast group of the MTCH including information the mobile stations UE should receive.

It should be noted that the access information transmitter unit 13A is configured to transmit, to a radio base station Node B, through an FACH which is a transport channel, access information included in the MCCH which is a logical channel.

The detailed information transmitter unit 15A is configured to transmit, to mobile stations UE, by use of an MTCH which is a traffic channel for the MBMS, the detailed information created by the emergency information receiver unit 11.

Here, the detailed information is to be transmitted by use of the MTCH belonging to the multicast group specified by the access information.

It should be noted that the detailed information transmitter unit 15A is configured to transmit, to the radio base station Node B, through an FACH which is a transport channel, the detailed information included in an MTCH which is a traffic channel (logical channel) for the MBMS.

Figure 9:
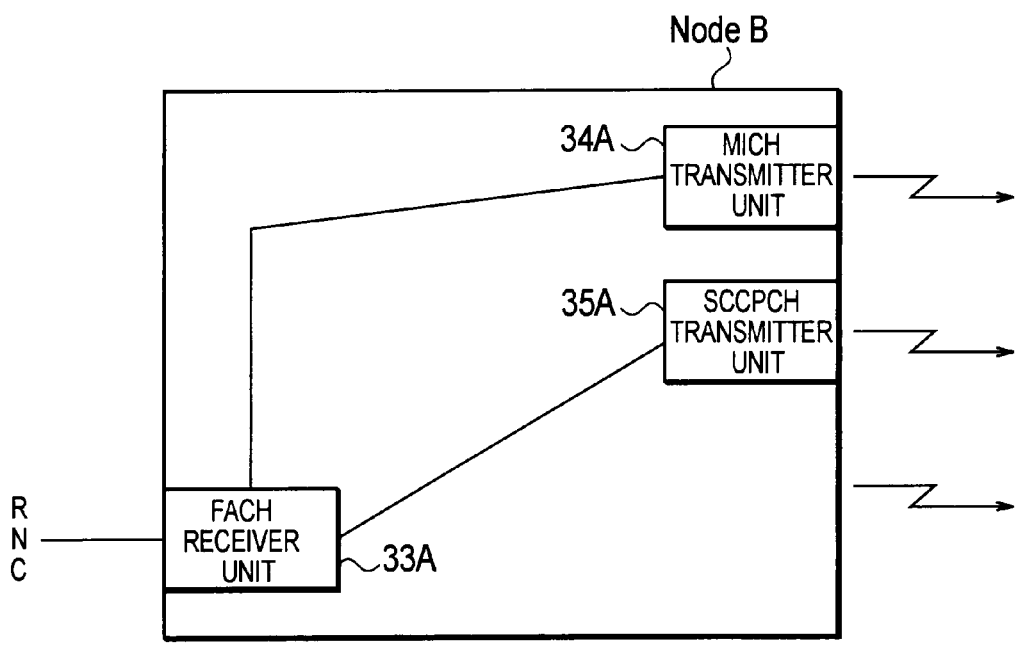
FIG. 9 is a functional block diagram of a radio base station Node B according to the second embodiment of the invention.

As shown in FIG. 9, a radio base station Node B includes an FACH receiver unit 33A, an MICH transmitter unit 34A and an SCCPCH transmitter unit 35A.

The FACH receiver unit 33A is configured to extract information included in an MCCH which is a logical channel transmitted through an FACH which is a transport channel, and then to notify the MICH transmitter unit 34A and the SCCPCH transmitter unit 35A of the information included in the MCCH.

The FACH receiver unit 33A is configured to extract information included in the MTCH which is a logical channel transmitted through the FACH which is a transport channel, and then to notify the SCCPCH transmitter unit 35A of the information included in the MTCH.

The MICH transmitter unit 34A is configured to transmit predetermined information, via an MBMS indication channel (MICH), which is a control channel for starting the MBMS (broadcast communication), and which is a physical channel for notifying a specific mobile station that there is incoming information.

Here, the MICH transmitter unit 34A may be configured to transmit, to mobile stations UE, by use of an MICH, the simplified information included in the FACH notified by the FACH receiver unit 33A.

Specifically, in a similar manner to the PICH transmitter unit 34 shown in FIG. 5, the MICH transmitter unit 34A may be configured to transmit the simplified information, by use of unused 12 bits in a frame constituting the MICH.

The SCCPCH transmitter unit 35A is configured to transmit an SCCPCH which is a physical channel including an MCCH transmitted through the FACH notified by the FACH receiver unit 33A, and to transmit an SCCPCH which is a physical channel including an MTCH transmitted through the FACH notified by the FACH receiver unit 33A.

In other words, the SCCPCH transmitter unit 35A may be configured to transmit, to mobile stations UE, the aforementioned simplified information by use of the MCCH associated with the SCCPCH.

Moreover, the SCCPCH transmitter unit 35A may be configured to transmit, to mobile stations UE, the aforementioned simplified information by use of the MTCH (traffic channel for MBMS) associated with the SCCPCH.

Figure 10:
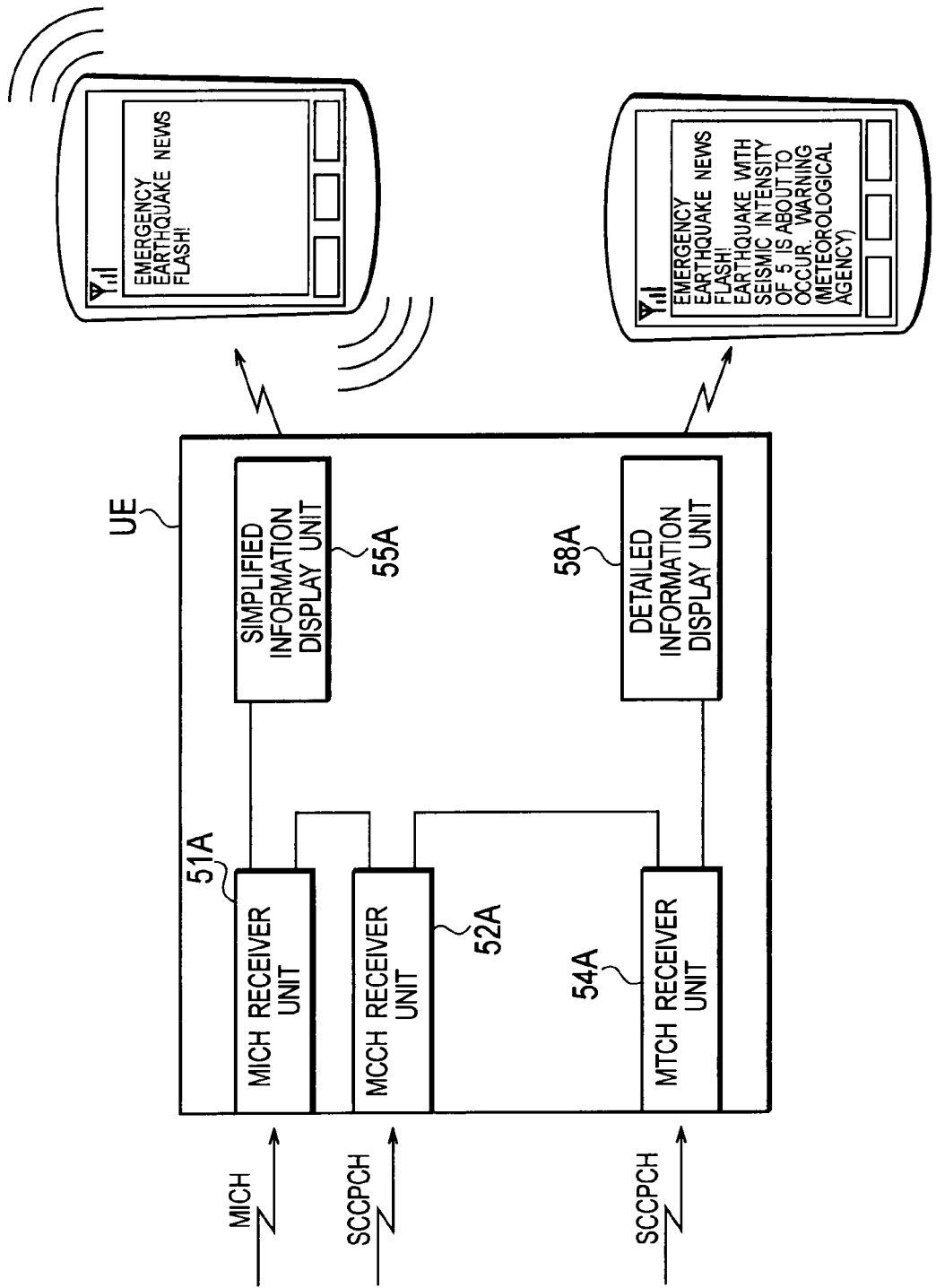
FIG. 10 is a functional block diagram of a mobile station UE according to the second embodiment of the invention.

As shown in FIG. 10, a mobile station UE includes an MICH receiver unit 51A, an MCCH receiver unit 52A, an MTCH receiver unit 54A, a simplified information display unit 55A and a detailed information display unit 58A.

The MICH receiver unit 51A is configured to receive information included in an MICH transmitted from a radio base station Node B, then to extract simplified information included in the received information, and to transmit the simplified information to the simplified information display unit 55A.

Moreover, the MICH receiver unit 51A is configured to receive information included in an MICH transmitted from a radio base station Node B, and then to notify the MCCH receiver unit 52A of information on the MCCH corresponding to the MICH.

The MCCH receiver unit 52A is configured to receive information included in an SCCPCH transmitted from a radio base station Node B, and then to receive information included in an MCCH associated with the SCCPCH.

The simplified information display unit 55A is configured to display, as shown in FIG. 10, the simplified information A received from the MICH receiver unit 51A.

Moreover, the simplified information display 55A is configured to display, as shown in FIG. 10, the simplified information A included in the MCCH received by the MCCH receiver 52A.

The MTCH receiver unit 54A is configured to receive information included in an SCCPCH transmitted from a radio base station Node B, in response to information included in the MCCH received by the MCCH receiver unit 52A, and then to receive information included in an MTCH included in the SCCPCH.

The detailed information display unit 58A is configured to display on the display screen, as shown in FIG. 10, the detailed information B received by the MTCH receiver unit 54.

(Operation of Mobile Communication System According to Second Embodiment of the Invention)

Hereinafter, an operation of the mobile communication system according to the present embodiment will be described with reference to FIG. 11.

Figure 11:
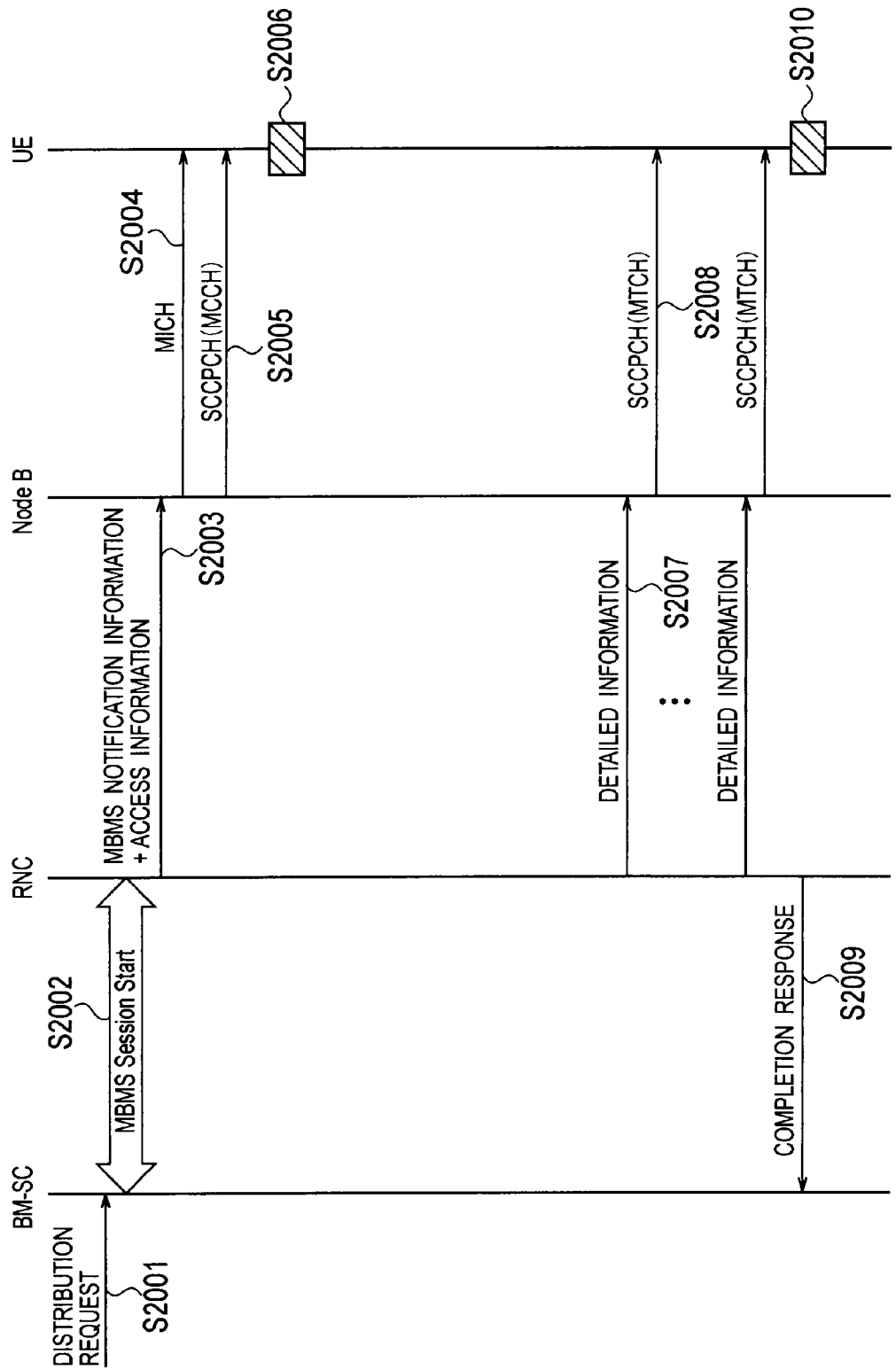
FIG. 11 is a sequence diagram showing an operation of transmitting emergency information in the mobile communication system according to the second embodiment of the invention.

As shown in FIG. 11, in step S2001, a distribution server BM-SC receives a distribution request for the emergency information such as earthquake information or "tsunami" information from a public office, a local government, or the like.

Here, assume that such distribution request includes the emergency information and information on a distribution area (MBMS service area) of the emergency information.

In step S2002, the distribution server BM-SC establishes an MEMS session between itself and a radio network controller RNC corresponding to the distribution area.

In step S2003, the radio network controller RNC transmits MEMS notification information included in an MCCH, to a radio base station Node B, via an FACH.

Here, the radio network controller RNC may insert the simplified information created on the basis of the emergency information into the MCCH and then transmit the simplified information with the MCCH, or may transmit the simplified information separately from the MCCH.

Moreover, in step S2003, through an FACH, the radio network controller RNC transmits, to the radio base station Node B, access information, which is included in an MCCH, for instructing the radio base station Node B to receive information included in an MTCH.

In step S2004, the radio base station Node B transmits information included in an MICH to mobile stations UE located in a specific distribution area, and in step S2005, transmits information included in the MCCH, via an SCCPCH associated with the MCCH, to the mobile stations UE located in a specific distribution area.

Here, the simplified information may be transmitted by the MICH, or may be transmitted by the MCCH associated with the SCCPCH.

In step S2006, the mobile stations UE display the simplified information received through one of the MICH and MCCH.

In step S2007, on the basis of the aforementioned access information, the radio network controller RNC transmits, to the radio base station Node B, through an FACH, detailed information included in an MTCH.

Specifically, the radio network controller RNC transmits the detailed information by an MTCH belonging to a multicast group specified in the aforementioned access information.

In step S2008, the radio base station Node B transmits the received detailed information included in the MTCH, via the SCCPCH.

In step S2009, the radio network controller RNC transmits, to the distribution server BM-SC, a "Report-Success" for notifying that the transmission of the aforementioned detailed information has been completed.

In step S2010, each of the mobile stations UE extracts and then displays the detailed information included in the MTCH, according to the aforementioned access information.

(Effect and Advantage of Mobile Communication System According to Second Embodiment of the Invention)

In the mobile communication system according to the embodiment, the emergency information is separated into the simplified information having a smaller amount of information and the detailed information having a greater amount of information, and a mobile station UE is configured to receive the simplified information through a control channel (one of an MICH and MCCH) for starting the MEMS (broadcast communication) instead of through a traffic channel (MTCH) for the MBMS. Thus, it is possible to resolve the problem of time delay for the emergency information to reach the mobile station.

The entire contents of the Japanese patent application no. 2006-169434 (filed on Jun. 19, 2006) are incorporated herein by reference.

Further, the entire contents of "3GPP TS23.041" and "3GPP TS23.246" are incorporated herein by reference.

The present invention has been described by using the above-described embodiments. However, it is obvious for those who are in the art that the present invention is not intended to be limited to the above-described embodiment. It is understood that the examples and embodiments described herein are for illustrative purpose only and that various modifications or changes will be suggested to one skilled in the art without departing from the scope of the present invention. Accordingly, this disclosure should not be construed that the description and the drawings, which constitute one part of this disclosure, are to limit the present invention.

Industrial Applicability

As described above, according to the present invention, it is possible to provide a mobile communication system, a mobile communication method, a radio network controller, a radio base station and a mobile station which are capable of reducing delay time during the transmission of the emergency information to mobiles stations by use of broadcast communication.

The invention claimed is:

1. A mobile communication system in which a radio device configured to transmit notification information transmitted from a distribution server, to a mobile station by use of broadcast communication, wherein:

the radio device comprises:
a creation unit configured to create, on the basis of the notification information received from the distribution server, simplified information indicating content of the notification information, and detailed information indicating content of the notification information with a greater amount of information than that of the simplified information;
a simplified information transmitter unit configured to transmit the simplified information to the mobile station by use of a PCCH (Paging Control Channel) for starting the broadcast communication;
a system information update request transmitter unit configured to transmit a system information update request via a BCCH (Broadcast Control Channel), wherein the BCCH is a control channel for broadcast communication; and
a detailed information transmitter unit configured to transmit the detailed information to the mobile station by use of a CTCH (Common Traffic Channel) after the system information update request transmitter unit transmits the system information update request via the BCCH, wherein the system information update request instructs the mobile station to refer to the CTCH for the broadcast communication, and the mobile station comprises
a display unit configured to display the detailed information transmitted using the CTCH, after displaying the simplified information transmitted using the PCCH.

2. A mobile communication method for transmitting notification information transmitted from a distribution server, from a radio device to a mobile station, by use of broadcast communication, the method comprising:
transmitting, at the distribution server, the notification information to the radio device;
creating, at the radio device, simplified information indicating content of the notification information, on the basis of the notification information received from the distribution server;
transmitting, at the radio device, the simplified information to the mobile station using a PCCH (Paging Control Channel) for starting the broadcast communication;
displaying, at the mobile station, the simplified information transmitted using the control channel;
creating, at the radio device, detailed information having a greater amount of information than that of the simplified information and indicating content of the notification information, on the basis of the notification information;
transmitting, at the radio device, a system information update request via a BCCH (Broadcast Control Channel), wherein the BCCH is a control channel for broadcast communication;
transmitting, at the radio device, the detailed information to the mobile station using a CTCH (Common Traffic Channel) after transmitting the system information update request via the BCCH, wherein the system information update request instructs the mobile station to refer to the CTCH for the broadcast communication and
displaying, at the mobile station, the detailed information transmitted using the CTCH.

3. A radio network controller configured to transmit notification information transmitted from a distribution server, to a mobile station by use of broadcast communication, the controller comprising:
a creation unit configured to create, on the basis of the notification information received from the distribution server, simplified information indicating content of the notification information, and detailed information having a greater amount of information than that of the simplified information and indicating content of the notification information;
a simplified information transmitter unit configured to transmit the simplified information to the mobile station by use of a PCCH (Paging Control Channel) for starting the broadcast communication;
a system information update request transmitter unit configured to transmit a system information update request via a BCCH (Broadcast Control Channel), wherein the BCCH is a control channel for broadcast communication; and
a detailed information transmitter configured to transmit the detailed information to the mobile station by use of a CTCH (Common Traffic Channel) after the system information update request transmitter unit transmits the system information update request via the BCCH, wherein the system information update request instructs the mobile station to refer to the CTCH for the broadcast communication.

4. The radio network controller according to claim 3, wherein the PCCH (Paging Control Channel) is a channel for notifying a specific mobile station that there is incoming information.

5. A radio base station configured to transmit notification information transmitted from a distribution server, to a mobile station by use of broadcast communication, the radio base station comprising:
- a simplified information transmitter unit configured to transmit, to the mobile station by use of a PCCH (Paging Control Channel) for starting the broadcast communication, simplified information indicating content of the notification information created on the basis of the notification information received from the distribution server;
- a system information update request transmitter unit configured to transmit a system information update request via a BCCH (Broadcast Control Channel), wherein the BCCH is a control channel for broadcast communication, and
- a detailed information transmitter unit configured to transmit, to the mobile station, detailed information indicating content of the notification information created on the basis of the notification information and having a greater amount of information than that of the simplified information by use of a CTCH (Common Traffic Channel) after the system information update request transmitter unit transmits the system information update request via the BCCH, wherein the system information update request instructs the mobile station to refer to the CTCH for the broadcast communication.

6. The radio base station according to claim 5, wherein the PCCH (Paging Control Channel) is a channel for notifying a specific mobile station that there is incoming information.

7. A mobile station configured to receive notification information transmitted by use of broadcast communication, comprising:
- a simplified information receiver unit configured to receive, through a PCCH (Paging Control Channel) for starting the broadcast communication, simplified information indicating content of the notification information created on the basis of the notification information transmitted from a distribution server;
- a detailed information receiver unit configured to receive detailed information indicating content of the notification information created on the basis of the notification information and having a greater amount of information than that of the simplified information through a CTCH (Common Traffic Channel) after receiving a system information update request via a BCCH (Broadcast Control Channel), wherein the BCCH is a control channel for broadcast communication and the system information update request instructs the mobile station to refer to the CTCH for the broadcast communication; and
- a display unit configured to display the received detailed information, after displaying the received simplified information.

* * * * *